US012672738B2

(12) United States Patent
Floessholzer et al.

(10) Patent No.: US 12,672,738 B2
(45) Date of Patent: Jul. 7, 2026

(54) COOKING APPARATUS WITH WEIGHING SYSTEM

(71) Applicant: VERSUNI HOLDING B.V., Eindhoven (NL)

(72) Inventors: Hannes Uwe Floessholzer, Eindhoven (NL); Jan Vaupot, Eindhoven (NL)

(73) Assignee: VERSUNI HOLDING B.V., Eindhoven (NL)

( * ) Notice: Subject to any disclaimer, the term of this patent is extended or adjusted under 35 U.S.C. 154(b) by 0 days.

(21) Appl. No.: 18/730,154

(22) PCT Filed: Jan. 17, 2023

(86) PCT No.: PCT/EP2023/051016
§ 371 (c)(1),
(2) Date: Jul. 18, 2024

(87) PCT Pub. No.: WO2023/139065
PCT Pub. Date: Jul. 27, 2023

(65) Prior Publication Data
US 2024/0415325 A1    Dec. 19, 2024

(30) Foreign Application Priority Data
Jan. 18, 2022    (EP) ..................................... 22152047

(51) Int. Cl.
*A47J 37/06* (2006.01)
*A23L 5/10* (2016.01)
(Continued)

(52) U.S. Cl.
CPC ............. *A47J 37/0641* (2013.01); *A23L 5/17* (2016.08); *A47J 36/321* (2018.08);
(Continued)

(58) Field of Classification Search
CPC .. A47J 37/0641; A47J 37/0664; A47J 36/321; A23L 5/17; F24C 7/087; F24C 15/325
See application file for complete search history.

(56) References Cited

U.S. PATENT DOCUMENTS

| | | | | |
|---|---|---|---|---|
| 4,299,115 A | * | 11/1981 | Athey | ..................... G01N 33/12 |
| | | | | 219/733 |
| 2019/0387922 A1 | * | 12/2019 | Jin | ............................. A23L 5/15 |

FOREIGN PATENT DOCUMENTS

| | | | | |
|---|---|---|---|---|
| EP | 2930432 A1 | * | 10/2015 | .............. A47J 27/62 |
| EP | 3760085 A1 | | 1/2021 | |

(Continued)

OTHER PUBLICATIONS

Extended European Search Report issued in connection with corresponding EP Application No. 22152047.1 dated Jul. 6, 2022.

*Primary Examiner* — Steven N Leff
(74) *Attorney, Agent, or Firm* — Maschoff Brennan

(57) ABSTRACT

Provided is a cooking apparatus including a housing arranged around a cooking chamber. The cooking apparatus also includes a food holder. The food holder has a food support for supporting food ingredients received inside the cooking chamber. The food holder also has an extended portion that extends outside the cooking chamber to contact the housing. The cooking apparatus includes an air circulation system for circulating air to the food ingredients received inside the cooking chamber. A weighing system is coupled to the food support via the extended portion such that the extended portion exerts a force on the weighing system corresponding to a weight of the food support received in the cooking chamber and any food ingredients supported thereon.

15 Claims, 6 Drawing Sheets

(51) Int. Cl.
    *A47J 36/32*          (2006.01)
    *F24C 7/08*           (2006.01)
    *F24C 15/32*         (2006.01)

(52) U.S. Cl.
    CPC ........... *A47J 37/0664* (2013.01); *F24C 7/087*
           (2013.01); *F24C 15/325* (2013.01)

(56)             References Cited

FOREIGN PATENT DOCUMENTS

| | | | |
|---|---|---|---|
| WO | 2018104351 | A1 | 6/2018 |
| WO | 2021004816 | A1 | 1/2021 |

\* cited by examiner

COOKING APPARATUS WITH WEIGHING SYSTEM

CROSS-REFERENCE TO RELATED APPLICATIONS

The present application is a U.S. National Phase application under 35 U.S.C. § 371 of International Application No. PCT/EP2023/051016 filed on Jan. 17, 2023, which claims the benefit of European Patent Application No. 22152047.1, filed on Jan. 18, 2022. This application is hereby incorporated by reference herein.

FIELD OF THE INVENTION

This invention relates to a cooking apparatus having an air circulation system and a weighing system.

BACKGROUND OF THE INVENTION

Various weighing systems, e.g. scales, for weighing food are available. Such systems may be stand-alone or, in some cases, may be integrated into a kitchen appliance, such as a food processor or cooking appliance, to supplement the main functionality of the kitchen appliance.

A user may utilize a stand-alone weighing system to measure the weight of food ingredients for the purpose of following a recipe to achieve a desired end result and/or so that food is cooked in a predictable cooking time. In cases in which the kitchen appliance weighs, e.g. automatically weighs, the food ingredients, the weight may be used by the kitchen appliance to control or indicate an operating parameter of the kitchen appliance.

A conventional way of implementing the weighing system in a kitchen appliance is to integrate load cells into the supporting feet of the kitchen appliance. A disadvantage of this approach is that physical interaction of the user with the kitchen appliance can interfere with the weight measurement. This can necessitate provision of instructions for the user to avoid contact with the kitchen appliance when the measurement is being carried out. Further sources of error can come from short-term relaxation of the power cord, and from the supporting feet when they are formed of rubber.

Other solutions make use of strain gages or piezo load cells. However, the temperature sensitivity of such components can provide an obstacle for their integration into certain kitchen appliances, particularly cooking appliances.

Alternative solutions involve integrating a means for food volume measurement into the kitchen appliance, and using the food volume measurement to estimate the weight of the food ingredients using an approximated multiplication factor associated with the specific food type. However, many such approaches add an undesirably large number components, including costly components, to the kitchen appliance. For example, estimation of the weight via volume measurement may utilize optical components, such as stereovision or time-of-flight cameras for the purpose of estimating a depth dimension of the food ingredients. Such optical components are required to optically interrogate a food preparation chamber of the kitchen appliance, but also may be required to be protected from exposure to harsh conditions. This may require protective windows into the chamber that need to be kept clean by the user and/or a solution for cooling the optical elements.

Accordingly, it remains a challenge to provide a simple, relatively inexpensive and reliable way of modifying a kitchen appliance, e.g. cooking appliance, to permit weighing of food ingredients.

EP 3 760 085 A1 discloses a cooking device for cooking food on a support (e.g. in a basket) within a cooking chamber. Cooking parameters are sensed over time so that a required cooking time can be determined. An intervention made by a user to the food is sensed during cooking, such as shaking the basket. The required cooking time is then re-determined.

WO 2021/004816 A1 discloses a cooking device for cooking food on a support (e.g. in a basket) within a cooking chamber. A required cooking time is determined based only on the time-evolution of the cooking chamber temperature and a power of the heating device. A first, less accurate, estimate of the required cooking time is determined within a first period, e.g. 90 seconds, of the turning on of the heating device and a second, more accurate, estimate of the required cooking is determined later, but e.g. within five minutes of the turning on of the heating device.

SUMMARY OF THE INVENTION

The invention is defined by the claims.

According to examples in accordance with an aspect of the invention, there is provided a cooking apparatus comprising: a housing defining a cooking chamber: a food holder comprising: a food support for supporting food ingredients received inside the cooking chamber; and an extended portion for extending outside the cooking chamber to contact the housing: an air circulation system for circulating air to the food ingredients received inside the cooking chamber; and a weighing system coupled to the food support via the extended portion such that the extended portion exerts a force on the weighing system corresponding to a weight of the food support received in the cooking chamber and any food ingredients supported thereon.

Monitoring the weight of food ingredients to be, and/or in the process of being, cooked by a cooking apparatus having an air circulation system may be beneficial because of the circulating air's effect on the cooking process, and in particular its capability to accelerate cooking. Moreover, it is desirable to weigh the food ingredients in a way which minimizes interference with the cooking apparatus, e.g. so as to minimize interference with the cooking process taking place in the cooking chamber. By the weighing system being coupled to the extended portion, weighing of the food ingredients in the cooking chamber may be implemented without requiring the user to interact with the food holder, e.g. without requiring the user to himself hold/support the food holder in order to weigh the food ingredients.

Moreover, since the extended portion extends outside the cooking chamber in order to couple the food support to the weighing system, the weighing system, e.g. load cell thereof, may be arranged outside the cooking chamber. In this manner, the risk of damage to the weighing system due to the conditions inside the cooking chamber may be reduced.

In some embodiments, the air circulation system is activatable to circulate air in the cooking chamber and deactivatable to cease said circulating of air, and the cooking apparatus further comprises one or more processors configured to: receive a first signal indicative of an initial weight of the food ingredients, the first signal being provided by the weighing system when the air circulation system is deactivated; receive a second signal indicative of the initial weight of the food ingredients and said circulating of air, the second signal being provided by the weighing system following activation of the air circulation system; compare the first signal and the second signal; receive a third signal indicative of a subsequent weight of the food ingredients and said circulating of air, the third signal being provided by the weighing system while the air circulation system is activated; and determine a measure of the subsequent weight of the food ingredients based on the third signal and said comparison between the first signal and the second signal.

Signals from the weighing system can be influenced by the circulating of air in the cooking chamber in which the food support is receivable. One possible way of addressing this issue is to deactivate the circulation system prior to weighing. However, interrupting the circulating of air in this manner is undesirable due to the risk of disrupting and/or prolonging the cooking process. Such interruption may also potentially confuse the user of the cooking apparatus, e.g. since they may mistake the interruption for weighing for the end of a cooking program having been reached.

By comparing the first signal and the second signal initially provided by the weighing system before and following activation of the air circulation system, the measure of the subsequent weight of the food ingredients can be accurately obtained from the third signal provided while the air circulation system is, e.g. remains, activated. In this way, the weight of the food ingredients can be relatively accurately monitored during use of the cooking apparatus without having to deactivate the air circulation system and risk disruption, user confusion and prolonging of the cooking process.

Thus, the measure of the subsequent weight of the food ingredients can be regarded as a measure of the subsequent weight of the food ingredients when corrected for the influence of the circulating of air.

In some embodiments, the housing includes a drawer slidable to gain access to the cooking chamber. In such embodiments, the food support may be coupled to the drawer via the extended portion. Coupling the food support to the drawer via the extended portion may enable particularly convenient arrangement of the weighing system in the cooking apparatus.

Alternatively or additionally, the cooking apparatus may comprise a lid openable to access the cooking chamber. In such embodiments, the food support may be loaded with food by opening the lid, e.g. by loading the food support from the top when the openable lid is provided above the cooking chamber when the cooking apparatus is orientated for use.

In some embodiments, the food holder comprises a handle, with the food support being coupled to the handle via the extended portion.

Coupling the food support to such a handle via the extended portion may enable particularly convenient arrangement of the weighing system in the cooking apparatus.

The food holder may, for instance, comprise a plurality of handles, with the weighing system being coupled to at least one of the plurality of handles.

More generally, the food holder may include a plurality of extended portions, each of which being configured for extending outside the cooking chamber to contact the housing. In such embodiments, the weighing system may be coupled to the food support via at least one of the plurality of extended portions such that the at least one of the plurality of extended portions exerts a force on the weighing system corresponding to a weight of the food support received in the cooking chamber and any food ingredients supported thereon.

In some embodiments, the food support is removable from the cooking chamber. This may assist cleaning of the cooking apparatus, including the cooking chamber, the food support, and, in at least some examples, exposed surfaces of the weighing system.

In some embodiments, the food holder may be detachable from the housing.

In such embodiments, the food support and the extended portion (and any further components of the food holder, e.g. the above-described handle) may be detached from the housing.

The weighing system may comprise a load cell.

In some embodiments, such a load cell may be mounted at the housing or at the food support.

The load cell may be arranged outside the cooking chamber. This may assist to protect the load cell from conditions within the cooking chamber during the cooking process.

In some embodiments, the cooking apparatus, and in particular the housing thereof, may include a bottom housing portion, and a side housing portion extending upwardly from the bottom housing portion when the cooking apparatus is orientated for use.

In such embodiments, the weighing system may comprise a load cell arranged adjacent the side housing portion, with the extended portion coupling the load cell to the food support.

Arranging the load cell adjacent the side housing portion in this manner may assist to minimize the risk of damage to the load cell, e.g. due to contaminants dripping onto the load cell during the cooking process.

In at least some embodiments, the extended portion is coupled to, in other words fixed to, a single load cell. This may provide a relatively simple, inexpensive and robust weighing system.

In some embodiments, the side housing portion is arranged between the load cell and the cooking chamber.

By arranging the side housing portion between the load cell and the cooking chamber, cooling of the load cell, e.g. the strain gauges or piezo load cells included therein, may be obviated due to the heat shielding provided by the side housing portion. Moreover, such an arrangement may protect the load cell from being soiled during the cooking process, thereby alleviating the burden on the user in terms of cleaning of the load cell.

In some embodiments, the load cell comprises a strain gauge arrangement comprising strain gauges arranged in a full Wheatstone bridge.

For example, the strain gauge arrangement includes two strain gauges for longitudinal strain and two strain gauges for transverse strain.

In at least some embodiments, the cooking apparatus comprises a heater for heating the cooking chamber and/or the circulating air.

The abovementioned one or more processors may, in some embodiments, be configured to control the heater to heat the cooking chamber and/or the circulating air prior to receiving the third signal. Heating of the cooking chamber and/or the circulating air may result in weight loss of the food ingredients during the cooking process. By the third signal being received subsequently to the heater being controlled to heat the cooking chamber and/or the circulating air, such weight loss of the food ingredients may be determined.

Alternatively or additionally, the one or more processors may be configured to control the heater to heat the cooking chamber only after the first and second signals have been provided by the weighing system. This may assist to avoid the first and second signals being affected by initial cooking, and concomitant initial weight loss, of the food ingredients.

In some embodiments, the one or more processors is or are configured to determine a difference between the subsequent weight and the initial weight.

The difference, e.g. weight loss, between the subsequent weight and the initial weight may assist to monitor the cooking process.

The one or more processors may, for example, be configured to control the heater based on the difference between the subsequent weight and the initial weight.

Alternatively or additionally, the one or more processors may be configured to control the air circulation system based on the difference between the subsequent weight and the initial weight.

In some embodiments, the cooking apparatus comprises a user interface, and the one or more processors is or are configured to control the user interface to provide an output based on the measure of the subsequent weight of the food ingredients. The measure may, for instance, be provided to the user via the user interface in grams.

Alternatively or additionally, the one or more processors may be configured to provide an output according to the difference between the subsequent weight and the initial weight.

Any suitable user interface can be considered for this purpose, such as one or more light emitting diodes whose illumination provides the output, a display, e.g. a touchscreen, configured to provide the output in alphanumeric form thereon, etc. Such a user interface may, for instance, be included in a user device, e.g. smart phone or tablet computer, in embodiments in which such a user device is included in the cooking apparatus.

In such embodiments, the output may be communicated from a cooking appliance to the user device, e.g. via an electrical connection or via wireless communication established between the cooking appliance and the user device.

Alternatively or additionally, the output may be presented on a display integrated in the handle and/or on a display included in a cooking appliance.

More generally, the measure of the subsequent weight of the food ingredients may be used to assist in, for instance, defining/controlling portions of food, following a recipe to achieve a desired food doneness and/or taste level, predicting cooking time, etc.

In some embodiments, the output based on the measure of the subsequent weight of the food ingredients may comprise at least one of a cooking time prediction, e.g. provided in hours, minutes and seconds, and an indicator of a food doneness level.

In some embodiments, the output provided by the user interface may indicate to the user that the cooking process is at or is approaching completion due to the difference between the subsequent weight and the initial weight being indicative of the cooking process being at or approaching completion.

In a non-limiting example, the food holder includes the handle, and the handle comprises the user interface, e.g. a user interface comprising a display. In such an example, the one or more processors is or are configured to control the user interface to present the output.

In such an example, the food support may also be removable from the cooking chamber such as to permit the food ingredients to be weighed prior to the food support being received in the cooking chamber.

The food support may include a base on which the food ingredients are supportable when the food holder is orientated for use.

In some embodiments, the cooking apparatus comprises an air vent arrangement configured to direct an airflow, generated by the air circulation system, normal to the base.

Such a direction of airflow can provide air frying-type conditions in the cooking chamber. Whilst such an airflow can potentially influence signals from the weighing system due to a buoyancy effect, and/or an opposing downwards forcing effect, of the airflow, this can be mitigated by the above-described comparison between the first signal and the second signal initially provided by the weighing system before and following activation of the air circulation system.

The food support may comprise a basket whose openings permit the circulating air to pass therethrough. Such openings may permit the circulating air, e.g. circulating heated air heated by the heater, to reach the food ingredients. Whilst this may influence signals from the weighing system, this can be mitigated by the above-described comparison between the first signal and the second signal initially provided by the weighing system before and following activation of the air circulation system.

More generally, the cooking apparatus may include a cooking appliance, e.g. a domestic cooking appliance.

Such a cooking appliance may, for instance, include the cooking chamber and the air circulation system, and, in some examples, also the food holder and the weighing system.

The cooking appliance, e.g. domestic cooking appliance, may be, for instance, an air fryer, an oven, or a steamer. Particular mention is made of an air fryer.

According to another aspect there is provided a method of using a cooking apparatus having a food support for supporting food ingredients, a cooking chamber for receiving the food support, an air circulation system activatable to circulate air in the cooking chamber and deactivatable to cease said circulating of air, and a weighing system coupled to the food support, the method comprising: receiving a first signal indicative of an initial weight of the food ingredients, the first signal being provided by the weighing system when the air circulation system is deactivated; receiving a second signal indicative of the initial weight of the food ingredients and said circulating of air, the second signal being provided by the weighing system following activation of the air circulation system; comparing the first signal and the second signal; receiving a third signal indicative of a subsequent weight of the food ingredients and said circulating of air, the third signal being provided by the weighing system while the air circulation system is activated; and determining a measure of the subsequent weight of the food ingredients based on the third signal and said comparison between the first signal and the second signal.

According to yet another aspect there is provided a computer program comprising computer program code which is configured, when the computer program is run on one or more processors included in a cooking apparatus further comprising a food support for supporting food ingredients, a cooking chamber for receiving the food support, an air circulation system activatable to circulate air in the cooking chamber and deactivatable to cease said circulating of air, and a weighing system coupled to the food support, to cause the one or more processors to implement the method described herein.

One or more non-transitory computer readable media may be provided, which non-transitory computer readable media have a computer program stored thereon, with the computer program comprises computer program code which is configured, when the computer program is run on the one or more processors, to cause the one or more processors to implement the method according to any of the embodiments described herein.

The one or more processors can be included in a cooking appliance included in the cooking apparatus, in a user device, for example a smart phone or tablet computer, separate from such a cooking appliance, and/or in a cloud-based server.

According to a further aspect there is provided a kitchen appliance comprising a food support for supporting food ingredients: a handle, the handle being graspable by a hand of a user to support the food support; and a weighing system, wherein the food support is coupled to the handle via the weighing system.

The food support, handle and weighing system may be as described herein for any of the embodiments of the cooking apparatus and method of using the cooking apparatus.

In some embodiments, the handle comprises a user interface, e.g. a user interface comprising a display. In such an example, the kitchen appliance may further include one or more processors configured to receive a measure of the weight of food ingredients supported by the food support, and control the user interface to provide an output based on the measure.

Alternatively or additionally, the food support may comprise or be a basket whose openings permit circulating air to pass therethrough, e.g. in the scenario in which the food support is received in a cooking chamber of a cooking appliance having an air circulation system for circulating air in the cooking chamber.

Alternatively or additionally, the food support may be insertable into and removable from a cooking chamber of a cooking appliance. The kitchen appliance may permit the food ingredients to be weighed prior to the food support being received in the cooking chamber.

It is noted that the kitchen appliance may be combined with a cooking appliance comprising a cooking chamber in which the food support is receivable and an air circulation system for circulating air in the cooking chamber. Such a combination may provide the cooking apparatus according to embodiments described herein.

Alternatively or additionally, the weighing system may comprise a load cell, and the kitchen appliance may further comprise an extended portion for coupling the load cell to the food support.

In at least some embodiments, the extended portion is coupled to, in other words fixed to, a single load cell.

The load cell may comprise a strain gauge arrangement comprising strain gauges arranged in a full Wheatstone bridge.

For example, the strain gauge arrangement includes two strain gauges for longitudinal strain and two strain gauges for transverse strain.

More generally, embodiments described herein in relation to the cooking apparatus may be applicable to the method, computer program/non-transitory computer readable media and kitchen appliance, and embodiments described herein in relation to the method and computer program/non-transitory computer readable media and kitchen appliance may be applicable to the cooking apparatus.

BRIEF DESCRIPTION OF THE DRAWINGS

For a better understanding of the invention, and to show more clearly how it may be carried into effect, reference will now be made, by way of example only, to the accompanying drawings, in which:

FIGS. 3A to 3D illustrate a design of a load cell included in an exemplary weighing system;

Figure 1:
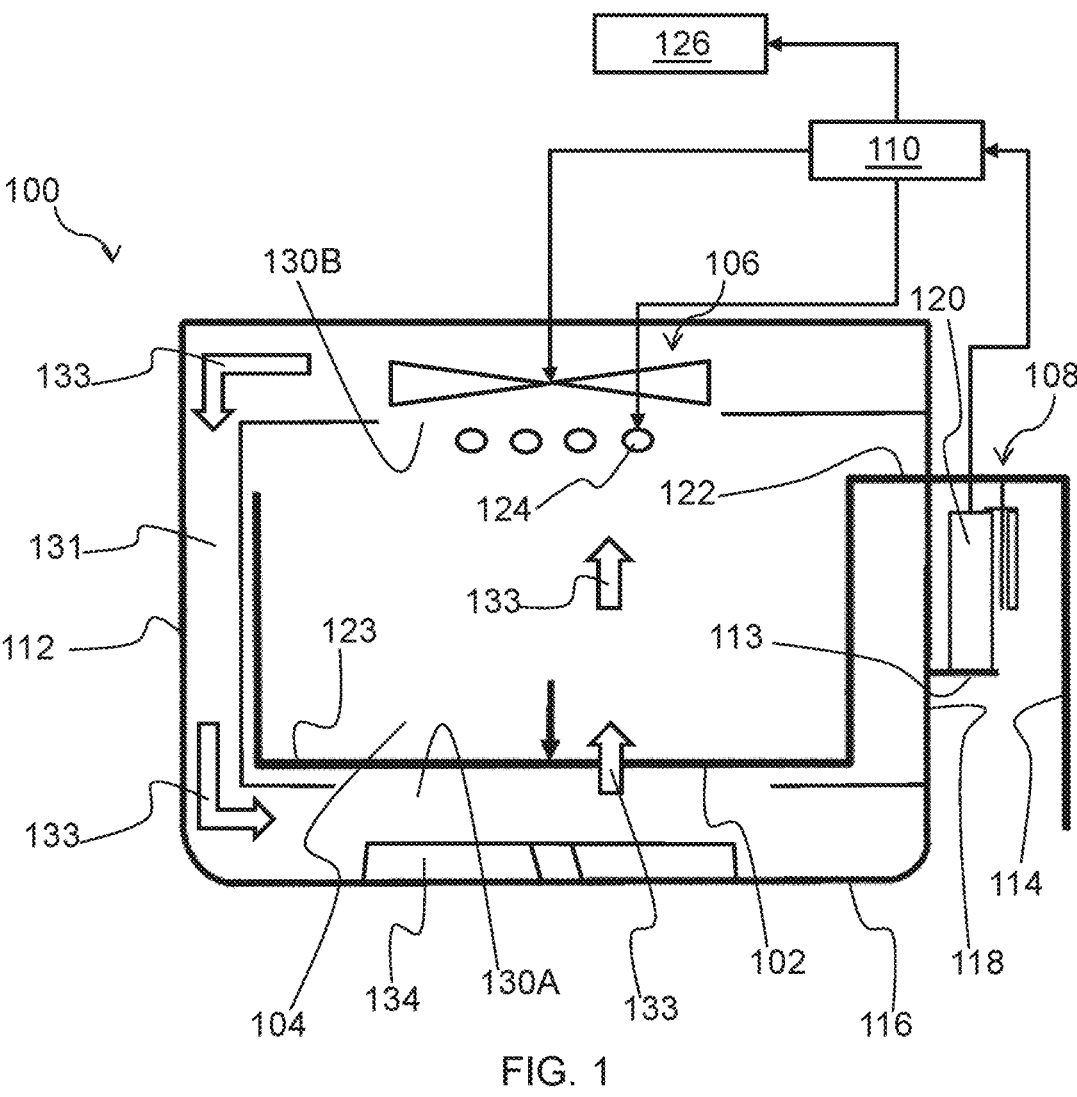
FIG. 1 schematically depicts a cooking apparatus according to an example.

DETAILED DESCRIPTION OF THE
EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Provided is a cooking apparatus comprising a housing arranged around a cooking chamber. The cooking apparatus also comprises a food holder. The food holder includes a food support for supporting food ingredients received inside the cooking chamber. The food holder also has an extended portion for extending outside the cooking chamber to contact the housing. The cooking apparatus comprises an air circulation system for circulating air to the food ingredients received inside the cooking chamber. A weighing system is coupled to the food support via the extended portion such that the extended portion exerts a force on the weighing system corresponding to a weight of the food support received in the cooking chamber and any food ingredients supported thereon.

Monitoring the weight of food ingredients to be, and/or in the process of being, cooked by a cooking apparatus having an air circulation system may be beneficial because of the circulating air's effect on the cooking process, and in particular its capability to accelerate cooking. Moreover, it is desirable to weigh the food ingredients in a way which minimizes interference with the cooking apparatus, e.g. so as to minimize interference with the cooking process taking place in the cooking chamber. By the weighing system being coupled to the extended portion, weighing of the food ingredients in the cooking chamber may be implemented without requiring the user to interact with the food holder, e.g. without requiring the user to himself hold/support the food holder in order to weigh the food ingredients.

Moreover, since the extended portion extends outside the cooking chamber in order to couple the food support to the weighing system, the weighing system, e.g. load cell thereof, may be arranged outside the cooking chamber. In this manner, the risk of damage to the weighing system may be reduced.

In some embodiments, the air circulation system is activatable to circulate air in the cooking chamber and deactivatable to cease said circulating of air, and the cooking apparatus further comprises one or more processors configured to receive a first signal indicative of an initial weight of the food ingredients, with the first signal being provided by the weighing system when the air circulation system is deactivated. The processor(s) may receive a second signal indicative of the initial weight of the food ingredients and the circulating of air, with the second signal being provided by the weighing system following activation of the air circulation system. The processor(s) may compare the first signal and the second signal. The processor(s) may receive a third signal indicative of a subsequent weight of the food ingredients and the circulating of air, with the third signal being provided by the weighing system while the air circulation system is activated. In such embodiments, the processor(s) determines or determine a measure of the subsequent weight of the food ingredients based on the third signal and said comparison between the first signal and the second signal.

Further disclosed herein is a method of using the cooking apparatus and a computer program for implementing the method.

A kitchen appliance comprising a weighing system and a food support is also described herein.

FIG. 1 schematically depicts a cooking apparatus 100 according to an example. The cooking apparatus 100 comprises a food holder 102 for supporting food ingredients (not visible). The cooking apparatus 100 also comprises a cooking chamber 104 in which at least part of the food holder 102 is receivable.

The cooking apparatus 100 comprises an air circulation system 106 for circulating air to the food ingredients received in the cooking chamber 104.

In some embodiments, the air circulation system 106 is activatable to circulate air in the cooking chamber 104 and deactivatable to cease said circulating of air. In other words, the air circulation system 106 can be switched on to cause the circulating of air and can be switched off so that no such circulating of air by the air circulation system 106 takes place.

The air circulation system 106 may comprise a fan and a motor, with rotation of the fan by the motor causing the circulating of air. Such a fan is schematically depicted in FIG. 1.

The cooking apparatus 100 further comprises a weighing system 108 coupled to the food holder 102. The weighing system 108 is configured to enable weighing of the food ingredients supported by the food holder 102.

Coupling the food holder 102 to the weighing system 108 can provide a convenient weighing arrangement, particularly relative to solutions in which a weighing system weighs the entire cooking apparatus. In other words, the weight measurement can be regarded as involving weighing the food ingredients and the food holder rather than a whole cooking appliance comprising the cooking chamber and air circulation system, thereby assisting to minimize user interaction-related errors. However, signals from the weighing system 108 can be influenced by the circulating of air in the cooking chamber 104 in which at least part of the food holder 102 is received when the air circulation system 106 is activated. One possible way of addressing this issue is to deactivate the circulation system 106 prior to weighing. However, interrupting the circulating of air in this manner is undesirable due to the risk of user confusion, since the interruption may be mistakenly understood by the user to signal the end of a cooking program. Moreover, such an interruption may risk disrupting and/or prolonging the cooking process.

For this reason the cooking apparatus 100 may comprise one or more processors 110 configured to receive a first signal indicative of an initial weight of the food ingredients, with the first signal being provided by the weighing system 108 when the air circulation system 106 is deactivated. Thus, the food holder 102 and any food ingredients supported by the food holder 102 are initially weighed without air being circulated.

The processor(s) 110 may receive a second signal indicative of the initial weight of the food ingredients and the circulating of air, with the second signal being provided by the weighing system 108 following activation of the air circulation system 106. In this way, the food holder 102 and any food ingredients supported by the food holder 102 are weighed in the presence of the circulating air.

The processor(s) 110 may compare the first signal and the second signal, thereby to assess an influence of the circulating of air on the initial weight of the food ingredients. For example, the processor(s) may determine a weight adjustment factor based on the comparison between the first and second signals.

The second signal may, for example, be provided by the weighing system 108 upon equilibration of the circulating of air by the air circulation system 106 and/or after a predetermined period of time has elapsed following activation of the air circulation system 106 in order that the second signal provides a representative indication of the effect of the circulating of air provided by the activated air circulation system 106 on the weighing.

Upon receiving a third signal from the weighing system 108 indicative of a subsequent weight of the food ingredients and the circulating of air, with the third signal being provided by the weighing system 108 while the air circulation system 106 is activated, the processor(s) 110 may determine a measure of the subsequent weight of the food ingredients based on the third signal and the comparison between the first signal and the second signal.

The subsequent weight of the food ingredients can, for example, be based on the third signal and the abovementioned weight adjustment factor derived from comparison of the first and second signals.

By comparing the first signal and the second signal initially provided by the weighing system 108 before and following activation of the air circulation system 106, the measure of the subsequent weight of the food ingredients can be accurately obtained from the third signal provided while the air circulation system is, e.g. remains, activated. In this way, the weight of the food ingredients can be relatively accurately monitored during use of the cooking apparatus 100 without having to deactivate the air circulation system 106 and risk user confusion, and disruption and/or prolonging of the cooking process.

It is noted that no tare of the weighing system 108 may be required, since the empty weight of the food holder 102, when no food ingredients are supported thereby, may be already known and pre-programmed into the processor(s) 110. The empty weight of the food holder 102 may be used by the processor(s) 110 to determine the measure of the subsequent weight of the food ingredients.

The one or more processors 110 can be implemented in numerous ways, with software and/or hardware, to perform the various functions required. The processor(s) 110 may, for example, employ one or more microprocessors programmed using software (e.g., microcode) to perform the required functions. Examples of processor components that may be employed in various embodiments of the present disclosure include, but are not limited to, conventional microprocessors, application specific integrated circuits (ASICs), and field-programmable gate arrays (FPGAs).

In various implementations, the one or more processors 110 may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into the one or more processors 110.

Whilst the above-described processing using the first, second and third signals can be implemented on on-board processor(s) 110 included in a cooking appliance included in the cooking apparatus 100, as shown in FIG. 1, this is not intended to be limiting, and in other examples the processing may be alternatively or additionally implemented in a cloud-based server and/or in a separate user device, such as a smart phone or tablet computer.

In some embodiments, the food holder 102, the cooking chamber 104, the air circulation system 106, and the weighing system 108 are included in a cooking appliance, e.g. a domestic cooking appliance, and the processor(s) 110 included in the user device and/or the cloud-based server is or are in communication, e.g. wireless communication, with the cooking appliance, in particular with the weighing system 108, in order to enable the processor(s) 110 to determine the measure of the subsequent weight of the food ingredients.

More generally, when a cooking appliance is included in, or in some non-limiting examples defines, the cooking apparatus 100, such a cooking appliance can be a domestic cooking appliance, such as an air fryer, an oven, or a steamer. Particular mention is made of an air fryer.

As shown in FIG. 1, the cooking apparatus 100 comprises a housing 112 arranged around the cooking chamber 104. The housing 112 thus defines/delimits the cooking chamber 104. In some embodiments, the food holder 102 may be coupled to the housing 112 via the weighing system 108. Coupling the food holder 102 to the housing 112 via the weighing system 108 may provide a particularly convenient way of arranging the weighing system 108 in the cooking apparatus 100. Whilst such an arrangement risks the signals from the weighing system 108 being influenced by the circulating of air in the cooking chamber 104, the influence of this circulating of air may be mitigated by the above-described comparison between the first signal and the second signal initially provided from the weighing system 108 before and following activation of the air circulation system 106.

Alternatively or additionally, the cooking apparatus 100 may comprise a handle 114 for the food holder 102, and wherein the food holder 102 is coupled to the handle 114 via the weighing system 108.

Coupling the food holder 102 to such a handle 114 via the weighing system 108 may provide a particularly convenient way of arranging the weighing system 108 in the cooking apparatus 100. Whilst such an arrangement risks the signals from the weighing system 108 being influenced by the circulating of air in the cooking chamber 104, the influence of this circulating of air may be mitigated by the above-described comparison between the first signal and the second signal initially provided by the weighing system 108 before and following activation of the air circulation system 106.

In the non-limiting example shown in FIG. 1, the weighing system 108 is mounted on a part 113 of the housing 112.

The housing 112 may, for instance, include a drawer (not visible in FIG. 1) slidable to gain access to the cooking chamber 104. In such a non-limiting example, the food holder 102 may be coupled to the drawer via the weighing system 108.

Alternatively or additionally, the cooking apparatus may comprise a lid (not visible in FIG. 1) openable to access the cooking chamber 104. In such embodiments, the food holder 102 may be loaded with food by opening the lid, e.g. by loading the food holder 102 from the top when the openable lid is provided above the cooking chamber 104 when the cooking apparatus 100 is orientated for use.

The weighing system 108 may comprise a load cell 120. The load cell 120, whose design will be described in more detail herein below, may provide the above-described first, second and third signals.

The load cell 120 may be arranged outside the cooking chamber 104. This may assist to protect the load cell 120 from conditions within the cooking chamber 104 during the cooking process.

The cooking apparatus 100, and in particular the housing 112 thereof, may comprise a bottom housing portion 116, and a side housing portion 118 extending upwardly from the bottom housing portion 116 when the cooking apparatus 100 is orientated for use, as shown in FIG. 1. Thus, the bottom housing portion 116 may be regarded as a base portion of the housing 112, e.g. which faces and is proximal to a kitchen countertop during use of the cooking apparatus 100.

In such embodiments, the load cell 120 may be arranged at the side housing portion 118, and an extended portion 122, e.g. lever, may be coupled to the load cell 120.

Arranging the load cell 120 at the side housing portion 118 in this manner may assist to minimize the risk of damage to the load cell 120, e.g. due to contaminants dripping onto the load cell 120 during the cooking process.

In some embodiments, such as that shown in FIG. 1, the side housing portion 118 is arranged between the load cell 120 and the cooking chamber 104. By arranging the side housing portion 118 between the load cell 120 and the cooking chamber 104 in this manner, the side housing portion 118 may serve as a barrier for protecting the load cell 120 from the conditions within the cooking chamber 104.

By arranging the side housing portion 118 between the load cell 120 and the cooking chamber 104, cooling of the load cell 120, e.g. the strain gauges or piezo load cells included therein, may be obviated due to the heat shielding provided by the side housing portion 118. Moreover, such an arrangement may protect the load cell 120 from being soiled during the cooking process, thereby alleviating the burden on the user in terms of cleaning of the load cell 120.

It is noted that a food support 123 included in the food holder 102 may, in some embodiments, be entirely supported by the extended portion 122, e.g. lever. This may assist to provide a more direct weight measurement. Hence the food holder 102 may, for instance, not include any feet for resting the food holder 102 on a surface of a pan at the bottom of the cooking chamber 104.

The presence of the internal walls delimiting the cooking chamber 104 may nonetheless assist to protect the load cell 120 from damage due to overstress, since such internal walls may assist to provide a physical limit on bending of the food holder 102, e.g. the extended portion 122.

The load cell 120 may, for example, be connected, e.g. via wiring, to the processor(s) 110 included in the cooking apparatus 100, for example with processor(s) 110 included in a cooking appliance, such as an air fryer.

The data from the load cell 120 can be used to calculate the weight of the food at start of cooking process and later, e.g. during the cooking process. Depending on the food type, the doneness can, for instance, be estimated by weight loss over time and the endpoint of the cooking process can be determined via the weight loss. This will be further described herein below.

It is noted that measurement of the weight of the food ingredients is possible when the food holder 102, e.g. a basket or mesh thereof, can move under the food load. This is called displacement. The weighing system 108 may accordingly be coupled directly to the food support 123, e.g. a basket; via the extended portion 122, e.g. lever, or, for example, coupled to a holding part, e.g. a plastic holding part, included in the housing 112; coupled to the handle 114 at such a holding part; coupled to a mesh of the abovementioned basket, and so on.

More generally, such an extended portion 122 is included in the food holder 102, and the extended portion 122 is configured for extending outside the cooking chamber 104 to contact the housing 112. In general, the food holder 102 also includes the food support 123 for supporting food ingredients received inside the cooking chamber 104.

The weighing system 118 is coupled to the food support 123 via the extended portion 122 such that the extended portion 122 exerts a force on the weighing system 108 corresponding to a weight of the food support 123 received in the cooking chamber 104 and any food ingredients supported thereon.

In embodiment in which the housing 112 includes a drawer slidable to gain access to the cooking chamber 104, the food support 123 may be coupled to the drawer via the extended portion 122. Coupling the food support 123 to the drawer via the extended portion 122 may enable particularly convenient arrangement of the weighing system 108 in the cooking apparatus 100.

In some embodiments, the food holder 102 comprises the abovementioned handle 114, with the food support 123 being coupled to the handle 114 via the extended portion 122. Coupling the food support 123 to such a handle 114 via the extended portion 122 may enable particularly convenient arrangement of the weighing system 108 in the cooking apparatus 100.

The food holder 102 may, for instance, comprise a plurality of handles (not visible in FIG. 1), with the weighing system 108 being coupled to at least one of the plurality of handles.

More generally, the food holder 102 may include a plurality of extended portions (not visible in FIG. 1), each of which being configured for extending outside the cooking chamber 104 to contact the housing 112. In such embodiments, the weighing system 108 may be coupled to the food support 123 via at least one of the plurality of extended portions such that the at least one of the plurality of extended portions exerts a force on the weighing system 108 corresponding to a weight of the food support 123 received in the cooking chamber 104 and any food ingredients supported thereon.

In some embodiments, the food support 123 is removable from the cooking chamber 104. This may assist cleaning of the cooking apparatus 100, including the cooking chamber 104, the food support 123, and, in at least some examples, exposed surfaces of the weighing system 108.

Removing the food support 123 from the cooking chamber 104 may, for instance, be facilitated by the handle 114 (when present).

In some embodiments, the food holder 102 may be detachable from the housing 112. In such embodiments, the food support 123 and the extended portion 122 (and any further components of the food holder 102, e.g. the above-described handle 114) may be detached together from the housing 112.

In some embodiments, the above-mentioned load cell 120 may be mounted at the housing 112 or at the food support 123.

In embodiments in which the load cell 120 is arranged adjacent the side housing portion, the extended portion 122 may couple the load cell 120 to the food support 123.

In at least some embodiments, the extended portion 122 is coupled to, in other words fixed to, a single load cell 102. This may provide a relatively simple, inexpensive and robust weighing system.

In at least some embodiments, the cooking apparatus 100 comprises a heater 124 for heating the cooking chamber 104 and/or the circulating air.

In other words, the heater 124 may be arranged to directly heat the food ingredients supported by the food support 123 when the food support 123 is received in the cooking chamber 104 and/or may be arranged to heat the air circulating by the air circulation system 106.

The heater 124 may have any suitable design, and may, for instance, comprise a resistive heating element. Coils of a spiral resistive heating element are schematically depicted in FIG. 1.

In such embodiments, the one or more processors 110 may be configured to control the heater 124 to heat the cooking chamber 104 and/or the circulating air prior to receiving the third signal.

Heating of the cooking chamber 104 and/or the circulating air may result in weight loss of the food ingredients during the cooking process. By the third signal being received subsequently to the heater 124 being controlled to heat the cooking chamber 104 and/or the circulating air, such weight loss of the food ingredients may be determined.

Alternatively or additionally, the one or more processors 110 may be configured to control the heater 124 to heat the cooking chamber 104 and/or the circulating air only after the first and second signals have been provided by the weighing system 108. This may assist to avoid the first and second signals being affected by initial cooking, and concomitant initial weight loss, of the food ingredients.

In some embodiments, the one or more processors 110 is or are configured to determine a difference between the subsequent weight and the initial weight. The difference, e.g. weight loss, between the subsequent weight and the initial weight may assist to monitor the cooking process.

It is noted that the processor(s) 110 may be configured to receive one or more further, e.g. fourth, fifth, sixth, seventh, and so on, signals respectively indicative of one or more further subsequent weights of the food ingredients and the circulating of air, with the one or more further signals being provided by the weighing system 108 while the air circulation system 106 is activated. The processor(s) 110 may determine measure(s) of the one or more further subsequent weights of the food ingredients based on the further signal(s) and said comparison between the first signal and the second signal.

Thus, the weight of the food ingredients may be closely monitored at intervals during the cooking process. Moreover, the one or more processors 110 may be configured to determine a difference between the one or more further subsequent weights and the initial weight.

In some embodiments, the one or more processors 110 is or are configured to control the heater 124 based on the difference between the subsequent weight and the initial weight, and/or based on the difference between one or more further subsequent weights and the initial weight.

Alternatively or additionally, the one or more processors 110 may be configured to control the air circulation system 106 based on the difference between the subsequent weight and the initial weight, and/or based on the difference between one or more further subsequent weights and the initial weight.

For example, the heater 124 and/or the air circulation system 106 may be controlled by the processor(s) 110 to lower the temperature and/or reduce an airspeed in the cooking chamber 104 should the difference between the subsequent weight and the initial weight be indicative of the cooking process being at or approaching completion.

In some embodiments, such as that shown in FIG. 1, the cooking apparatus 100 comprises a user interface 126, and the one or more processors 110 is or are configured to control the user interface 126 to provide an output based on the measure of the subsequent weight of the food ingredients.

Alternatively or additionally, the one or more processors 110 may be configured to provide an output according to the difference between the subsequent weight and the initial weight, and/or based on the difference between the one or more further subsequent weights and the initial weight.

Any suitable user interface 126 can be considered for this purpose, such as one or more light emitting diodes whose illumination provides the output, a display, e.g. a touch-screen, configured to provide the output in alphanumeric form thereon, etc. Such a user interface 126 may, for instance, be included in the abovementioned user device, e.g. smart phone or tablet computer (in embodiments in which such a user device is included in the cooking apparatus 100).

In such embodiments, the output may be communicated from a cooking appliance to the user device, e.g. via an electrical connection or via wireless communication.

Alternatively or additionally, the output may be presented on a display integrated in the handle 114 and/or on a display included in a cooking appliance included in the cooking apparatus 100.

The measure of the subsequent weight of the food ingredients may be used to assist in, for instance, defining/controlling portions of food, following a recipe to achieve a desired food doneness and/or taste level, predicting cooking time, etc.

In some embodiments, the output based on the measure of the subsequent weight of the food ingredients may comprise at least one of a cooking time prediction, e.g. provided in hours, minutes and seconds, and an indicator of a food doneness level.

For example, the output provided by the user interface 126 may indicate to the user that the cooking process is at or is approaching completion due to the difference between the subsequent weight and the initial weight being indicative of the cooking process being at or approaching completion.

In a non-limiting example, the cooking apparatus 100 includes the handle 114, the food support 123 coupled to the handle 114 via the extended portion 122, and the handle 114 comprises the user interface 126, e.g. a user interface 126 comprising a display. In such an example, the one or more processors 110 is or are configured to control the user interface 126 to present a food weight output based on a signal received from the weighing system 108.

In such an example, the food support 123 may also be removable from the cooking chamber 104 such as to permit the food ingredients to be weighed prior to the food support 123 being received in the cooking chamber 104, e.g. while the food support 123 is being supported by the user. The food ingredients can also be weighed when the food support 123 is received in the cooking chamber 104 and/or when the air circulation system 106 is activated, as previously described.

Figure 2:
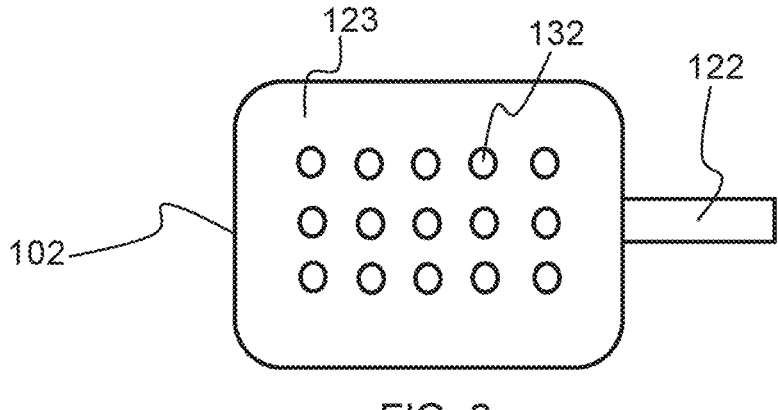
FIG. 2 provides a schematic plan view of a food support and a handle.

The food support 123 may include a base on which the food ingredients are supportable when the food holder 102 is orientated for use, as shown in FIGS. 1 and 2.

The cooking apparatus 100 may comprise an air vent arrangement 130A, 130B configured to direct an airflow normal to the base when the air circulation system 106 is circulating air, e.g. when the air circulation system 106 is activated.

Such a direction of airflow can provide air frying-type conditions in the cooking chamber 104. Whilst such an airflow can potentially influence signals from the weighing system due to a buoyancy effect, and/or an opposing downwards forcing effect, of the airflow, this can be mitigated by the above-described comparison between the first signal and the second signal initially provided by the weighing system 108 before and following activation of the air circulation system 106, provided that the circulating of air when the second signal is provided is also generated by the air circulation system 106 when the third signal is provided.

The cooking apparatus 100 may, for example, comprise a lower air vent 130A facing the base of the food support 123, and an upper air vent 130B arranged above the food support 123. The airflow may be drawn by the air circulation system 106, e.g. fan, from the cooking chamber 104 through the upper air vent 130B and into a duct 131. The airflow may be passed from the duct 131 back into the cooking chamber 104 via the lower air vent 130A. This direction of airflow is represented in FIG. 1 by the arrows 133.

Alternatively or additionally, the airflow may be directed by the air circulation system 106 downwards through the cooking chamber 104 towards the lower air vent 130A, into the duct 131, and back into the cooking chamber 104 via the upper air vent 130B, e.g. by rotating the fan in the opposite direction from that used to provide the direction of airflow represented in FIG. 1 by the arrows 133.

In some embodiments, the cooking apparatus 100 comprises an air guide member 134 in the duct 131, with the air guide member 134 being configured to guide air from the duct 131 into the lower air vent 130A, and/or from the lower air vent 130A into the duct 131.

The air guide member 134 may, for example, comprise a so-called star-fish shape. The star-fish shape comprises a plurality of radial fins which are shaped to guide air in the duct 131 towards and through the lower air vent 130A into the cooking chamber 104 and/or from the lower air vent 130A into the duct 131.

In some embodiments, such as that shown in FIG. 2, the food support 123, e.g. base, has one or more openings 132 for permitting the airflow to pass therethrough.

In a non-limiting example, the food support 123 comprises or is a basket whose openings 132 permit the circulating air to pass therethrough.

Such openings 132 may permit the circulating air, e.g. circulated heated air which is heated by the heater 124, to reach the food ingredients. Whilst this may influence signals from the weighing system 108, this can be mitigated by the above-described comparison between the first signal and the second signal initially provided by the weighing system 108 before and following activation of the air circulation system 106.

FIGS. 3A to 3D schematically illustrate a design of a load cell 120 included in an exemplary weighing system 108.

In this non-limiting example, the load cell 120 comprises a mounting portion 136 to which a bending beam 138 is attached. The bending beam 138 comprises a bending beam area 140 comprising a strain gauge arrangement 142A, 142B, 142C, 142D.

Figure 3C:
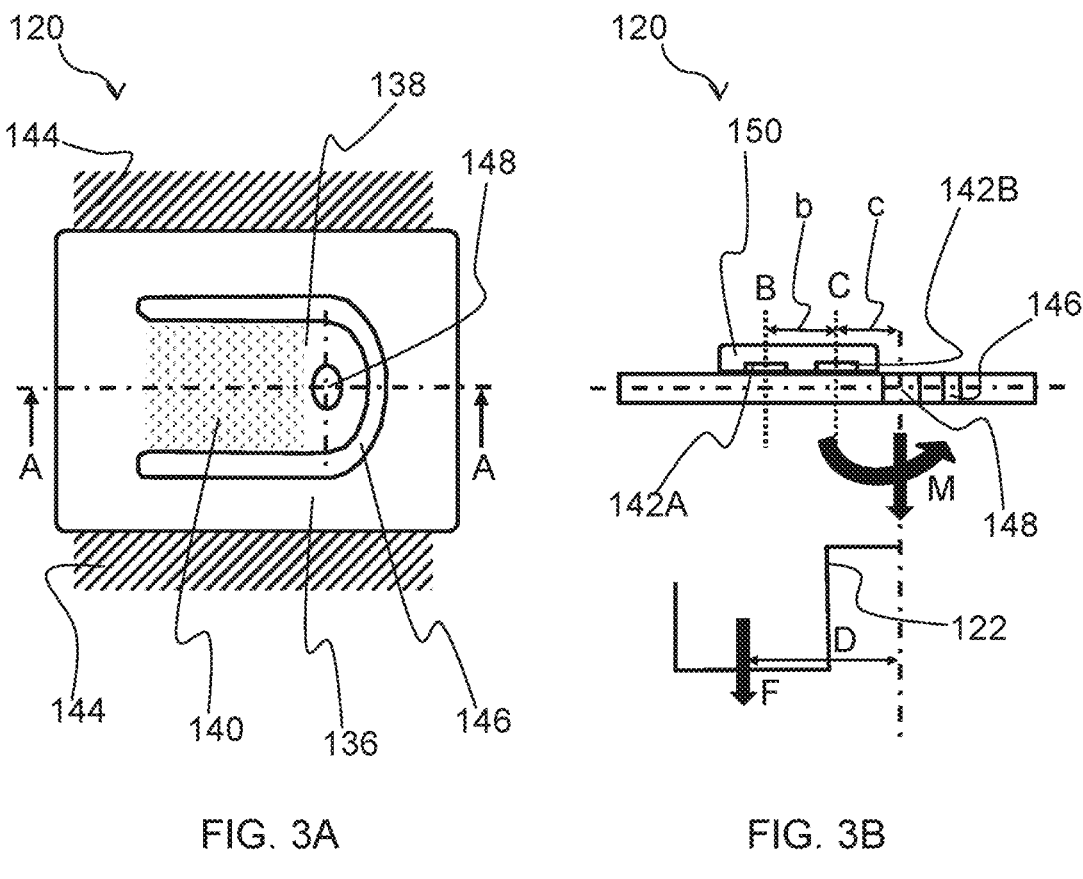
Figure 3C:
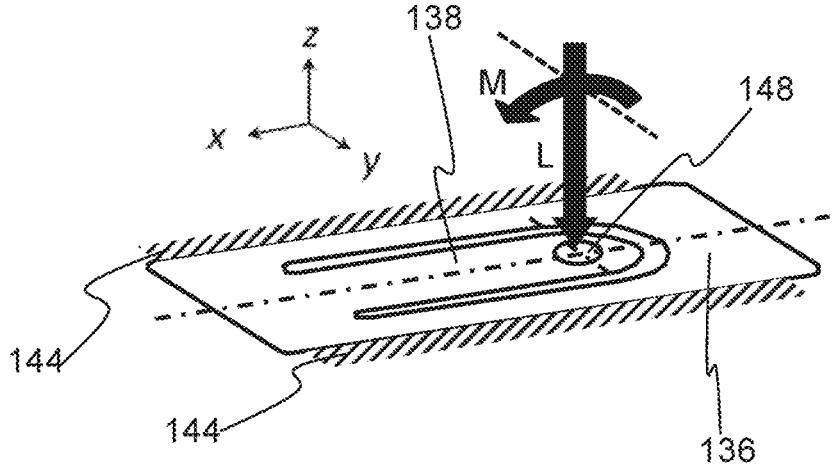

A load cell mounting area 144 is also represented in FIGS. 3A and 3C. FIG. 3B shows a cross-section A-A of the load cell 120 illustrated in FIG. 3A.

A gap 146 is provided between the mounting portion 136 and the bending beam 138 for accommodating bending of the bending beam 138 relative to, and in particular towards and away from, the mounting portion 136.

An aperture 148 delimited by the bending beam 138 may enable securement of a load, in this case the food support 123, thereto, e.g. via a screw (not shown in FIGS. 3A to 3D) extending through the aperture 148 to secure the extended portion 122, e.g. lever, to the bending beam 138.

In some embodiments, the load cell 120 comprises a strain gauge arrangement 142A, 142B, 142C, 142D including two strain gauges 142B, 142C for longitudinal strain and two strain gauges 142A, 142D for transverse strain.

The two strain gauges 142A, 142D for transverse strain may be provided at least partly for temperature compensation purposes.

The strain gauges of the strain gauge arrangement 142A, 142B, 142C, 142D may be covered by a protection layer 150, as shown in FIG. 3B.

Figure 3D:
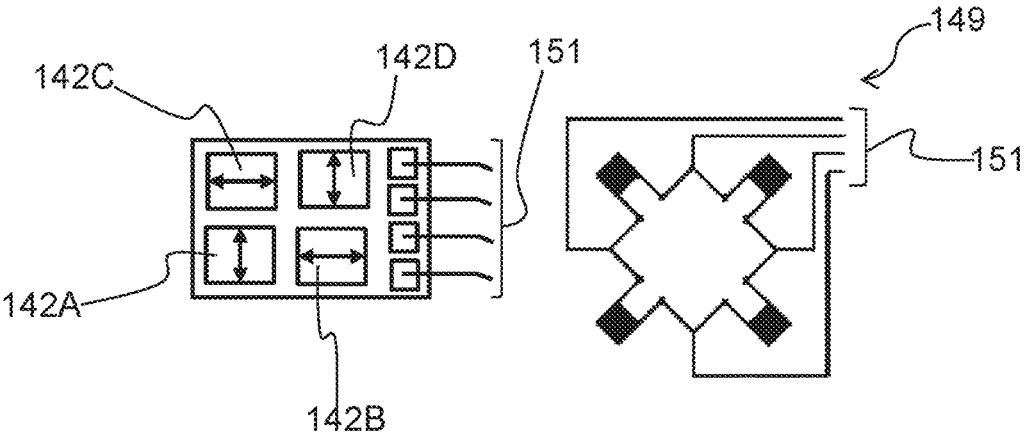

In some embodiments, the strain gauges of the strain gauge arrangement 142A, 142B, 142C, 142D are switched in a full Wheatstone bridge 149. An example of this is shown in FIG. 3D. This may assist to ensure that the weight is independent of the distance of the weight to the load cell 120, as will be explained in more detail herein below.

The strain gauges 142A, 142B, 142C, 142D are shown in FIG. 3D as being connected to the full Wheatstone bridge 149 via wiring 151.

Referring to FIGS. 3A and 3B, $M_B$ is the bending moment at position B, $M_C$ is the bending moment at position C, $\varepsilon_B$ is the strain at position B, and $\varepsilon_C$ is the strain at position C.

The load, L, shown in FIG. 3C is equal to the force, F, shown in FIG. 3B. Further, the bending moment, M, is equal to the distance D multiplied by F.

$$M_B=F(b+c)-FD$$

$$M_C=Fc-FD$$

$\varepsilon$=M/WE, where W is the bending beam section modulus and E is the Young's modulus of the sensor material.

It follows that $\varepsilon_B=(F(b+c)-FD)/(WE)$, and $\varepsilon_C=(Fc-FD)/WE$ The output of the full Wheatstone bridge 149 is proportional to:

$$\varepsilon_B-\varepsilon_C=Fb/WE$$

This result means that the output is independent of the distance D.

Shear forces may be generated in the load cell 120 by the weight of the food support 123 and the food ingredients. Depending on the distance D of the centre of gravity of the food ingredients to the load cell 120, the magnitude of the momentum may vary. However, it is observed that the load cell 120 output may correspond to the same (correct) load independent of the distance D from the centre of gravity of the food ingredients to the load cell 120. This can be regarded as being due to the intelligence of the load cell 120 compensating for torsion of the extended portion 122, e.g. lever. Deflection of the extended portion 122 measurement may be used by itself to calculate the weight of the food ingredients.

It has been found that the weighing system 108 employed in embodiments of the present disclosure can have a resolution of <5 g, and thus can distinguish relatively small changes in the weight of the food ingredients during the cooking process.

Moreover, the weighing system 108 may provide accurate and consistent measurement results: less than ±10 g has been found when accounting for the influence of the circulating of air by the air circulation system 106:

| Weight on food support 123/g | First weighing result/g | Second weighing result/g | Third weighing result/g | Average weighing result/g |
|---|---|---|---|---|
| 50 | 50 | 50 | 50 | 50 |
| 100 | 100 | 100 | 100 | 100 |

Figure 4:
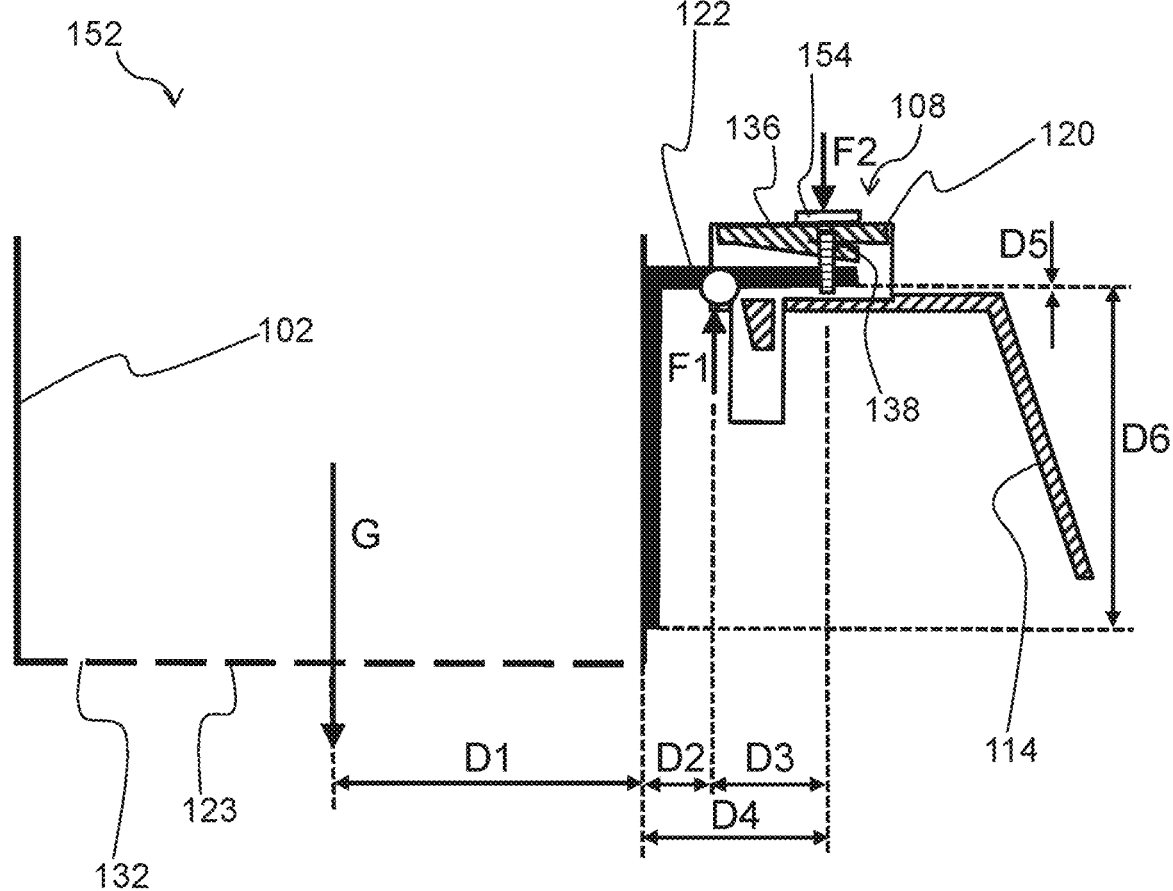
FIG. 4 schematically depicts a food support and weighing system according to an example.

FIG. 4 schematically depicts a food support 123 and a weighing system 108 coupled thereto. In such an example, the food support 123 and the weighing system 108 may be regarded as being included in a kitchen appliance 152.

The kitchen appliance 152 comprises a handle 114, with the handle 114 being graspable by a hand of a user to support the food support 123. The kitchen appliance 152 further comprises a weighing system 108, with the food support 123 being coupled to the handle 114 via the weighing system 108.

It is noted that the kitchen appliance 152 may be combined with a cooking appliance (not visible in FIG. 4) comprising a cooking chamber 104 in which the food support 123 is receivable and an air circulation system 106 for circulating air in the cooking chamber 104. Such a combination may provide the above-described cooking apparatus 100.

In other words, the food support 123 may be insertable into and removable from such a cooking chamber 104 of a cooking appliance. The kitchen appliance 152 may permit the food ingredients to be weighed prior to the food support 123 being received in the cooking chamber 104.

Whilst not visible in FIG. 4, the handle 114 may comprise a user interface, e.g. a user interface comprising a display. In such an example, the kitchen appliance 152 may further include one or more processors (not visible in FIG. 4) configured to receive a signal indicative of the weight of food ingredients supported by the food support 123, and control the user interface to provide a food weight output based on the signal.

In a non-limiting example, the food weight output comprises a food portion or diet advisory made for the user when loading the food support 123, e.g. basket, with food. In such an example, the food weight output may comprise an alert signal that there is enough food supported by the food support 123, e.g. for a selected number of people. Alternatively or additionally, the advisory may comprise a recipe-related advisory.

In embodiments in which the food weight output comprises a cooking time estimate and/or process requirement(s) for desired doneness, several possibilities can be contemplated. For example, a user may add food ingredients to the food support 123, read the food weight output in the form of a measure of the weight of the food ingredients on a display included in the handle 114, and enter this measure as an input to an external user device, for example a smart phone or tablet computer. Algorithms employed via such a user device may use the input for calculation of cooking time and/or process requirement(s) for desired doneness.

In another non-limiting example, a user may add food ingredients to the food support 123 and the signal, or a measure of the weight of the food ingredients from the weighing system 108, may be transferred, e.g. via wireless communications unit included in the kitchen appliance 152, to an external user device, and algorithms may subsequently calculate the cooking time and/or process requirement(s) for desired doneness.

In a further non-limiting example, a user may add food ingredients to the food support 123 and the kitchen appliance 152 has an interface, e.g. flexible pin connection, connectable with a cooking appliance such that, when the food support 123 is received in the cooking chamber 104, the connection is established and the signal indicative of the weight of food ingredients supported by the food support 123 (or weighing data based on such a signal) is transferred to processor(s) 110 included in the cooking appliance configured to receive the signal and calculate the cooking time and/or process requirement(s) for desired doneness.

The weighing system 108 may comprise a load cell 120, and an extended portion 122, e.g. lever, for coupling the load cell 120 to the food support 123.

The load cell 120 may comprise a strain gauge arrangement 142A, 142B, 142C, 142D comprising strain gauges arranged in a full Wheatstone bridge 149.

For example, the strain gauge arrangement 142A, 142B, 142C, 142D includes two strain gauges 142B, 142C for longitudinal strain and two strain gauges 142A, 142D for transverse strain, as described above in respect of FIGS. 3A to 3D.

It is noted that such a load cell 120 design, and the manner of its incorporation into the kitchen appliance 152 and/or the cooking apparatus 100, may be relatively simple and may therefore be relatively inexpensive and robust, e.g. in that the load cell 120 is capable of withstanding relatively high temperatures, as well as soiling by fumes, splatter, or crumbs. Moreover, a cooling solution and regular cleaning may not be required, as previously described.

It is noted that a screw 154 is employed in the non-limiting example shown in FIG. 4 for securing the extended portion 122, e.g. lever, to the bending beam 138 via the abovementioned aperture 148 delimited by the bending beam 138. However, any suitable connection element may be utilized to secure the extended portion 122, e.g. lever, to the load cell 120, e.g. to the bending beam 138 thereof.

In this respect, the extended portion 122 may, in some non-limiting examples, comprise a guiding rail secured to the food support 123, which guiding rail is also fixed to the load cell 120, e.g. to the bending beam 138 thereof.

FIG. 4 shows a design for improving sensitivity for relatively low weights by including support for the extended portion 122 at point F1. This may increase the force on the load cell F2, although sensitivity to the position of the load G may be increased.

Figure 5:
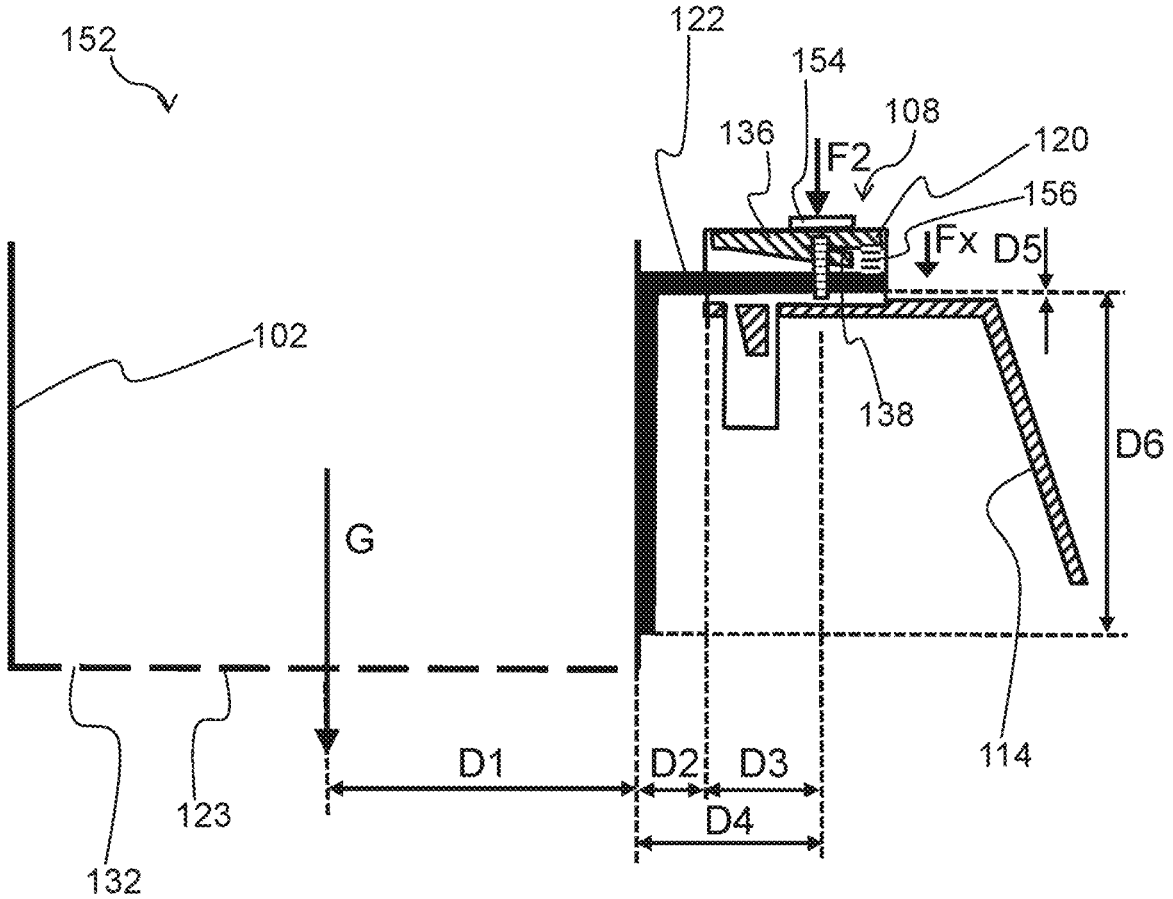
FIG. 5 schematically depicts a food support and weighing system according to another example.

FIG. 5 shows a design in which the weighing system 108 further comprises a pre-loaded (see force Fx) spring element 156 arranged between the extended portion 122 and the load cell 120. This may decrease the force on the load cell 120. The maximum total load on the load cell 120 can be halved in this way.

Purely for the purpose of providing an illustrative non-limiting example, in FIGS. 4 and 5, D1 is 115 mm, D2 is 20 mm, D3 is 52 mm, D4 is 72 mm, and D5 is 5 mm.

More generally, the kitchen appliance 152 may be used for various applications, e.g. in combination with a cooking appliance, such as an air fryer, as previously described. When being utilized in combination with an air fryer, the food support 123 may be in the form of a basket whose openings 132 permit air circulating in the cooking chamber 104 to pass therethrough.

However, the kitchen appliance 152 may, for instance, be used as a kitchen scale or portion measurer. In such a scenario, the food support 123 in the form of a basket may be detachably coupled, e.g. via a snap-fit connection, to the handle 114 via the weighing system 108, and can accordingly be replaced by, for instance, a kitchen scale plate, cup or spoon, etc. configured to detachably couple to the handle 114 via the weighing system 108.

In some embodiments, the kitchen appliance may be supplied as a kit of parts comprising a plurality of different food supports 123, with each food support 123 being configured to detachably couple to the handle 114 via the weighing system 108.

Figure 6:
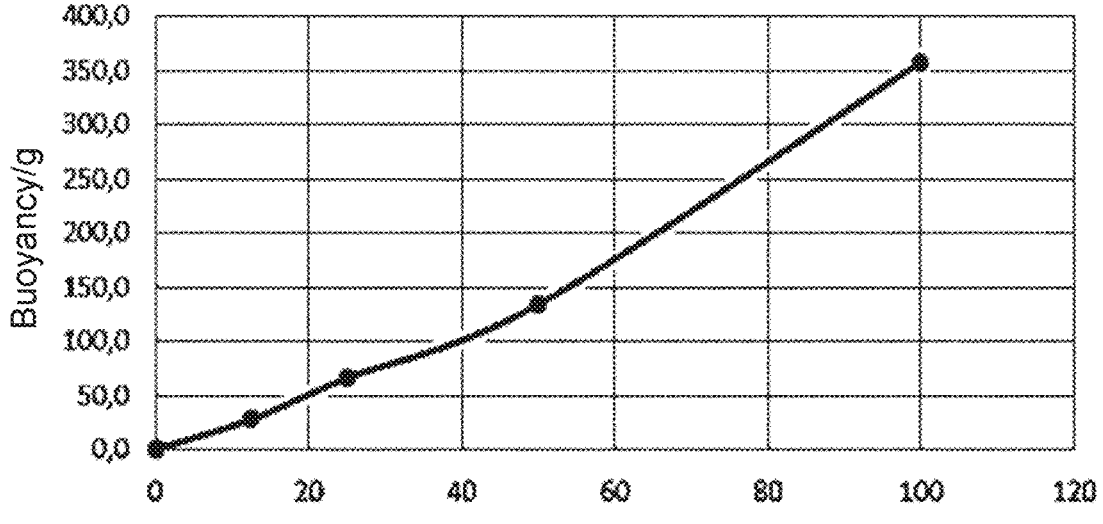
FIG. 6 provides a graph of buoyancy due to circulating of air by an air circulation system vs fractional blocking of openings of a food support placed in the circulating air.

FIG. 6 provides a graph of buoyancy due to circulating of air by an air circulation system 106 of a cooking apparatus 100 vs fractional blocking of openings 132 of a food support 123 placed in the circulating air.

In this particular non-limiting example, the cooking apparatus 100 comprises an air fryer which when activated, i.e. turned on, causes the apparent weight of the food support 123 (in this case in the form of a basket) and the food ingredients to decrease because the airflow generates a buoyancy effect. In this particular example, the buoyancy generated by the airflow was ~40 g with 1 piece of bell pepper.

As shown in FIG. 6, this buoyancy may increase with increasing coverage of the surface of the basket by the food ingredients. This is because greater coverage provides greater resistance to airflow.

Inaccuracy of weighing due to this buoyancy effect can nonetheless be mitigated by the comparison between the first signal and the second signal initially provided by the weighing system before and following activation of the air circulation system, as previously described.

Figure 7:
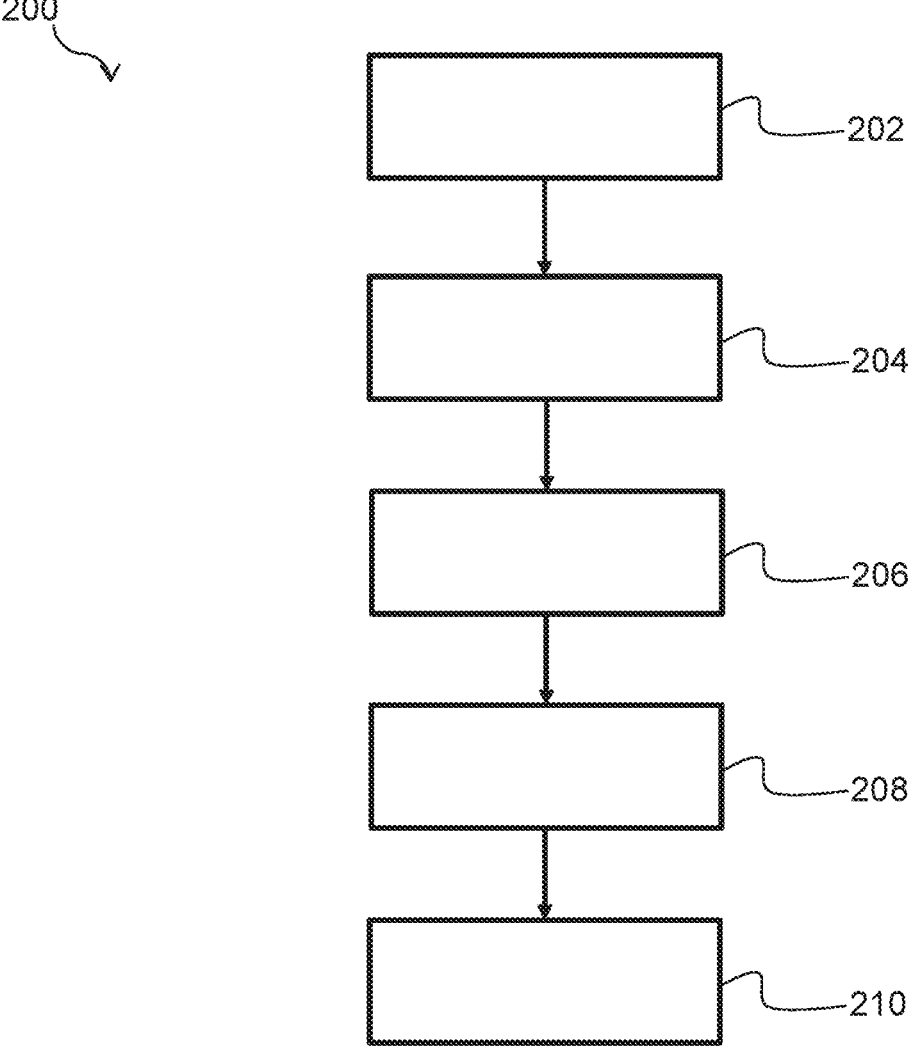
FIG. 7 provides a flowchart of a method of using a cooking apparatus according to an example.

FIG. 7 provides a flowchart of a method 200 of using a cooking apparatus having a food support for supporting food ingredients, a cooking chamber for receiving the food support, an air circulation system activatable to circulate air in the cooking chamber and deactivatable to cease the circulating of air, and a weighing system coupled to the food support. The cooking apparatus may, for example, be a cooking apparatus 100 according to any of the embodiments described above.

The method 200 comprises receiving 202 a first signal indicative of an initial weight of the food ingredients, with the first signal being provided by the weighing system when the air circulation system is deactivated.

A second signal indicative of the initial weight of the food ingredients and the circulating of air is received in 204, with the second signal being provided by the weighing system following activation of the air circulation system.

The method comprises comparing 206 the first signal and the second signal.

It is noted that the steps 202 and 204 can be implemented in any order provided that the comparison 206 of the first and second signals can be made. More generally, the order of steps indicated by the flowchart of FIG. 7 should not be regarded as being limiting.

A third signal indicative of a subsequent weight of the food ingredients and the circulating of air is received in 208, with the third signal being provided by the weighing system while the air circulation system is activated.

A measure of the subsequent weight of the food ingredients is made in 210 based on the third signal and said comparison between the first signal and the second signal.

A computer program comprising computer program code may be configured, when the computer program is run on one or more processors 110 included in a cooking apparatus 100 further comprising a food support 123 for supporting food ingredients, a cooking chamber 104 for receiving the food support 123, an air circulation system 106 activatable to circulate air in the cooking chamber and deactivatable to cease said circulating of air, and a weighing system 108 coupled to the food support 123, to cause the one or more processors 110 to implement the method 200.

The one or more processors 110 can be included in a cooking appliance, e.g. a cooking appliance comprising the cooking chamber 104 and the air circulation system 106. Alternatively or additionally, the one or more processors 110 can be included in a user device, for example a smart phone or tablet computer, separate from such a cooking appliance, and/or in a cloud-based server.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A cooking apparatus comprising:
a food support for supporting food ingredients;
a cooking chamber for receiving the food support;
an air circulation system activatable to circulate air in the cooking chamber and deactivatable to cease said circulating of air;
a weighing system coupled to the food support; and
one or more processors configured to:
receive a first signal indicative of an initial weight of the food ingredients, the first signal being provided by the weighing system when said air circulation system is deactivated;
receive a second signal indicative of the initial weight of the food ingredients influenced by said circulating of air, the second signal being provided by the weighing system following activation of said air circulation system;

compare said first signal and said second signal to assess an influence of said circulating of air on the initial weight due to at least one of a buoyancy effect and an opposing downwards forcing effect of an airflow of the circulating air;
receive a third signal indicative of a subsequent weight of the food ingredients influenced by said circulating of air, the third signal being provided by the weighing system while said air circulation system is activated; and
determine a measure of the subsequent weight of the food ingredients by removing the assessed influence of said circulating of air from the subsequent weight based on the third signal and said comparison between the first signal and the second signal.

2. The cooking apparatus of claim 1, comprising:
a housing defining said cooking chamber; and
a food holder comprising an extended portion and said food support, the food support being for supporting food ingredients received inside the cooking chamber, the air circulation system being for circulating air to the food ingredients received in the cooking chamber, and the extended portion being for extending outside the cooking chamber to contact the housing, wherein the weighing system is coupled to the food support via the extended portion such that the extended portion exerts a force on the weighing system corresponding to a weight of the food support received in the cooking chamber and any food ingredients supported thereon.

3. The cooking apparatus of claim 2, wherein the food holder comprises a handle, and wherein the food support is coupled to the handle via the extended portion.

4. The cooking apparatus of claim 2, wherein the housing comprises a drawer slidable to gain access to the cooking chamber, and wherein the food support is coupled to the drawer via the extended portion.

5. The cooking apparatus of claim 2, comprising:
a bottom housing portion;
a side housing portion extending upwardly from said bottom housing portion when the cooking apparatus is orientated for use, wherein the weighing system comprises a load cell arranged adjacent said side housing portion, said extended portion coupling the load cell to the food support.

6. The cooking apparatus of claim 5, wherein the side housing portion is arranged between the load cell and the cooking chamber.

7. The cooking apparatus of claim 2, wherein the food support has a base on which the food ingredients are supportable when the food holder is orientated for use, and wherein the cooking apparatus comprises an air vent arrangement configured to direct an airflow, generated by the air circulation system, normal to the base.

8. The cooking apparatus of claim 7, wherein the base has one or more openings for permitting said airflow to pass therethrough.

9. The cooking apparatus of claim 1, comprising a heater for heating the cooking chamber and/or the circulating air.

10. The cooking apparatus of claim 9, wherein the one or more processors is or are configured to control the heater to heat the cooking chamber and/or the circulating air prior to receiving said third signal.

11. The cooking apparatus of claim 1, wherein the one or more processors is or are configured to determine a difference between said subsequent weight and said initial weight.

12. The cooking apparatus of claim 1, comprising a user interface, wherein the one or more processors is or are configured to control the user interface to provide an output based on the measure of the subsequent weight of the food ingredients.

13. The cooking apparatus of claim 1, wherein the food support is removable from the cooking chamber.

14. The cooking apparatus of claim 1, wherein the food support comprises a basket whose openings permit said circulating air to pass therethrough.

15. The cooking apparatus of claim 1, wherein the cooking apparatus comprises a cooking appliance in the form of an air fryer.

* * * * *